United States Patent
Girardon et al.

(10) Patent No.: US 6,766,079 B2
(45) Date of Patent: Jul. 20, 2004

(54) FIBRE GRATING OPTICAL WAVEGUIDE DEVICE

(75) Inventors: Valérie Girardon, Brétigny-sur-Orge (FR); Isabelle Riant, Orsay (FR); Alain Fradet, Issy-les-Moulineaux (FR); Martine Tessier, Levallois Perret (FR)

(73) Assignee: Avanex Corporation, Fremont, CA (US)

( * ) Notice: Subject to any disclaimer, the term of this patent is extended or adjusted under 35 U.S.C. 154(b) by 66 days.

(21) Appl. No.: 10/032,538

(22) Filed: Jan. 2, 2002

(65) Prior Publication Data

US 2002/0090174 A1 Jul. 11, 2002

(30) Foreign Application Priority Data

Jan. 8, 2001 (EP) .............................. 01440002

(51) Int. Cl.[7] .............................. G02B 6/34; G02B 6/26; G02B 6/02; G02B 6/22
(52) U.S. Cl. .............................. 385/37; 385/31; 385/126; 385/127; 385/128
(58) Field of Search ............... 385/31, 37, 126–128

(56) References Cited

U.S. PATENT DOCUMENTS

| | | | |
|---|---|---|---|
| 4,725,110 A | | 2/1988 | Glenn et al. |
| 4,923,278 A | | 5/1990 | Kashyap et al. |
| 5,042,898 A | | 8/1991 | Morey et al. |
| 5,694,503 A | * | 12/1997 | Fleming et al. ............... 385/37 |
| 5,761,376 A | * | 6/1998 | Gering ....................... 388/844 |
| 5,851,427 A | | 12/1998 | Kelly |
| 6,067,392 A | * | 5/2000 | Wakami et al. .............. 385/37 |
| 6,240,225 B1 | * | 5/2001 | Prohaska .................... 385/37 |

FOREIGN PATENT DOCUMENTS

| | | |
|---|---|---|
| EP | 0293911 A2 | 12/1988 |
| EP | 0730172 A1 | 7/1996 |
| EP | 0798573 A1 | 10/1997 |

OTHER PUBLICATIONS

T. Iwashima, et al.: "Temperature Compensation Technique for Fibre Bragg Gratings Using Liquid Crystalline Polymer Tubes", Electronics Letters, Feb. 27, 1997, pp. 417–419, vol. 33, No. 5.

Atsushi Shiota, et al.: "Rigid Rod and Liquid Crystalline Thermosets", Progr. Polym. Sci. 1997, pp. 975–1002, vol. 22.

* cited by examiner

Primary Examiner—John D. Lee
Assistant Examiner—Tina M Lin
(74) Attorney, Agent, or Firm—Moser, Patterson & Sheridan, L.L.P.

(57) ABSTRACT

The present invention relates to a fiber grating filter optical waveguide device, comprising an optical fiber consisting essentially of silica, whereby said optical fiber has an area with a diffractive grating region and wherein said area with a diffractive grating region is covered with a material having a negative thermal expansion coefficient $\alpha$ satisfying the following equation:

$$\alpha = -(dn_{eff}/dT)/n_{eff}$$

wherein $dn_{eff}/dT$ is the thermo-optic coefficient of the fiber material and $n_{eff}$ is the effective refractive index. Furthermore, the present invention provides a method of manufacturing such a device.

10 Claims, No Drawings

FIBRE GRATING OPTICAL WAVEGUIDE DEVICE

BACKGROUND OF THE INVENTION

The invention is based on a priority application EP 01 440 002.2 which is hereby incorporated by reference.

The present invention relates to a Fibre Grating Optical Waveguide Device and a method of manufacturing the same.

Optical filters have numerous applications in optical communications and in particular, they can be used for providing wavelength selectivity and tuning in WDM (wavelength division multiplexing) and DWDM (dense wavelength division multiplexing) systems. For this purpose, transmission filters based on diffractive grating structures or diffractive fibre grating structures, offer near ideal filter response and high channel isolation. Furthermore they can be used in sensor applications. The term "grating structures" as used in the following and in the field of optics in general defines structures comprising for example FBG (fibre Bragg gratings), SBG (slanted Bragg gratings), LPG (long period gratings) and mode converters.

Often the material of the optical fibre and consequently the wavelengths passing through the fibre is affected by thermal changes. For example, an uncompensated grating displays a shift in the so-called "Bragg wavelength" over a 100° C. temperature range as large as 1 nm which leads to serious problems in some optics systems applications. An increase or decrease in temperature has to be balanced in order to maintain a good tuning and/or selection of the wavelengths in the optical fibre.

The center wavelength (or Bragg-wavelength) $\lambda_B$ of a filter is given by the following equation:

$$\lambda_B = 2\Lambda n_{eff}$$

Where $\Lambda$ is the period of the grating and $n_{eff}$ is the effective refractive index.

The change in the Bragg wavelength $\lambda_B$ for a temperature variation $\Delta T$ is given by:

$$\Delta\lambda_B/\Delta T = 2\Lambda(dn_{eff}/dT + n_{eff}\alpha)$$

whereby $\alpha$ is the linear thermal expansion coefficient of the fibre.

The variation in the center of the fibre is strongly influenced by the thermo-optic coefficient $dn_{eff}/dT$ which is about $10-11\cdot 10^{-6}$/K for germania-silica or silica glasses. The expansion term contributes less than ten percent of the total variability.

To avoid this undesired temperature dependency, two methods for athermalizing diffractive gratings are known which provide thermal control of the FBG in a device environment:

The first athermalization method is conventionally termed as "active", providing a thermal control of the entire device environment. Active athermalization, however, needs an external power source to provide a constant and controlled temperature which is costly to elaborate and to power. Furthermore the compensating device, often termed as "package" or "packaging" is not compact enough for many applications.

The second athermalization method is termed as "passive" which is conventionally achieved by two ways:

The first way makes use of an arrangement, where the filter is maintained in a mechanical structure comprising two materials having different but positive thermal expansion coefficients (TEC). The design is such that the final dilatation behaviour results in a negative elongation of the fibre with an increasing temperature. The second way is to manufacture the diffractive grating directly into a structure comprising a single material (polymer or ceramic) with a negative TEC.

The FBG is packaged into a structure in such a way that the strain is relieved as the temperature increases. The reducing strain compensates the increasing refractive index and holds $\lambda_B$ constant:

$$\Delta\lambda_B/\Delta T = 0 \rightarrow \alpha_{FBG\,packaged} = -(dn_{eff}/dT)/n_{eff}$$

Passive athermalization is well known in the art:

U.S. Pat. No. 5,042,898 discloses a package which compensates the wavelength shift with temperature. This is achieved by a combination of two materials having different thermal expansion coefficients. This effect is being used to partially relieve the tension applied to the optical fibre with a temperature increase, and vice versa with a temperature decrease.

To avoid optical fibre buckling when temperature increases, the optical fibre is always maintained under tension. The disadvantage of the know passive athermalization methods is that the optical fibre is fixed on the package at only two points by the help of clamps or glue. This packaged device is very sensitive towards ageing which results in an uncontrolled variation of fibre tension, therefore in an uncontrolled shift of $\lambda_B$. The difficulty to ensure a stable and desired center wavelength is a major disadvantage of this method.

Iwashima et al. in Electronics Letters 1997, Vol.33, p. 417–419 and furthermore in EP-A-0798 573 proposed a multilayer package around the fibre. The fibre is hold in a tube made of a liquid-crystall polymer and fixed into the tube by an epoxy glue or silicon. A major disadvantage of this method is the fact that obtaining perfectly concentrically surrounding layers requires a tedious and technically demanding process which leads often to non-reproducible results.

The underlying problem of the invention was therefore to provide a fiber grating filter optical waveguide device which is not influenced by variations in temperature.

SUMMARY OF THE INVENTION

This problem is solved by a fiber grating filter optical waveguide device with the features of claim 1.

Accordingly, a fibre grating filter optical waveguide device comprises an optical fibre consisting essentially of silica, whereby said optical fibre has an area with a diffractive grating region and wherein said area with a diffractive grating region is covered with a material having a negative thermal expansion coefficient $\alpha$ satisfying the following equation:

$$\alpha = -(dn_{eff}/dT)/n_{eff}$$

wherein $dn_{eff}/dT$ is the thermo-optic coefficient of the fibre material and $n_{eff}$ is the effective refractive index.

It is preferred that the material is a polymeric material. Polymeric materials display an easily controllable behaviour, so that they can be chosen and tailored according to the specific needs of an application, so that the adhesion between a glassy material as for example a fibre and the polymeric material is optimized. Furthermore, they can be easily applied on the surface of Bragg gratings.

It is still further preferred that the polymeric material is a crosslinked polymeric material and/or display anisotropic mechanical and thermomechanical properties. It is preferred to use crosslinkable monomeric or oligomeric precursors which are generally easier to apply than the corresponding polymers.

Advantageously, the monomeric and/or oligomeric precursor materials of said polymeric material display LC characteristics in the molten state.

The problem underlying the invention is further solved by a method for manufacturing a fiber grating optical waveguide device according to the invention comprising the following steps:

forming a diffraction grating area along an optical axis of an optical fibre bringing in contact of at least said area of the optical fibre monomeric and/or oligomeric precursor materials forming a layer or a coating of said monomeric and/or oligomeric precursor materials on at least said area curing the layer of the monomeric and/or oligomeric precursor materials The curing according to the invention is carried out after applying the monomeric and/or oligomeric precursor materials onto the optical fibre with the diffractive grating region. This implies an excellent adhesion between the polymeric material and the material of the fibre surface is obtained.

The curing is carried out preferably by temperature, UV, electron beam or gamma irradiation, but any other method known by a person skilled in the art is applicable as well. By deliberately choosing the curing temperature, the crosslinking degree can be adapted to the specific requirements of the polymeric coating.

In a further advantageous embodiment, the monomeric and/or oligomeric precursor materials are aligned in a magnetic field along the fibre axis before or during curing. This leads to an uniaxial orientation of the corresponding monomers and/or oligomers, so that a controllable negative TEC of polymeric material in the fibre axis direction is obtained with the suitable value ($-7$ to $-9 \cdot 10^{-6}$/K). The negative TEC of the polymer coating, which is especially advantageous compensates the positive thermal sensitivity of the filter.

It is understood that the afore mentioned advantages and the features of the invention explained in the following, are not only used in the specifically described combination, but can also be used by a person skilled in the art in other combinations or alone, without exceeding the scope of the invention.

In the following, the invention is described in detail.

First of all, definitions of terms used herein are given in order to allow a better understanding of the present invention The term "covered" as used herein means that the material with said advantageous thermal expansion coefficient is arranged in direct contact without any interfaces, as for example local fixation means like clamps, resin or glue, on the surface of the area with a Bragg grating region of an optical fibre. The term "covered" means also that the material exhibits a good adhesion property on the optical fibre. In an advantageous embodiment, the area is wholly covered by said material Athermal "package" or "packaging" refers to any means capable of counterbalancing thermal effects on optical filter wavelengths.

The diffractive grating, especially a Bragg grating, of an optical fibre is formed by any method known by a person skilled in the art, as for example disclosed in U.S. Pat. No. 4,725,110 or in EP 0 730 172 A1.

In the following, the working principle of the invention is explained in detail:

The principle of the compensation of temperature influences on the Bragg wavelength in Fibre Bragg gratings according to the invention is based on a "passive" method. A coating of a material, preferably a polymeric material, is concentrically surrounding the optical fibre having the grating area. This material is characterized by a negative thermal expansion coefficient $\alpha$ (TEC) equal to $\alpha_{FBG\ packaged}$ ($-7$ to $-9 \cdot 10^{-6}$/K). Depending on the nature of the fibre, the values of the thermooptic coefficient and effective refractive index are variable. In most cases, a value in the range comprising $10–11.10^{-6}$/K and $1.45–1.47$ will be sufficient. Accordingly, a fibre grating filter optical waveguide device comprises an optical fibre consisting essentially of silica, whereby said optical fibre has an area with a diffractive grating region and wherein said area with a diffractive grating region is covered with a material having a negative thermal expansion coefficient $\alpha$ satisfying the following equation:

$$\alpha = -(dn_{eff}/dT)n_{eff}$$

wherein $dn_{eff}/dT$ is the thermo-optic coefficient of the fibre material and $n_{eff}$ is the effective refractive index.

The preferred polymeric material is made from suitable monomeric and/or oligomeric precursor materials. These precursor materials are preferably molecules comprising:

mesogenic groups (rigid or semi-rigid core) which confer the precursors liquid-crystalline behaviour cross-linkable end groups which ensure the polymerization and the formation of the final polymeric material.

Several classes of monomeric and/or oligomeric precursors can be used without exceeding the scope of the present invention. The cross-linking groups may be acetylene, maleimide, amide, cyanate, isocyanate, acrylate, methacrylate or epoxy groups, or other groups known to a person skilled in the art, alone or in combination with curing agents such as amine compounds. The rigid or semi-rigid rod mesogen groups comprise aromatic, cycloaliphatic or aliphatic groups (for example biphenyl, phenyl, benzoate, methyl-stilbene, naphthyl structures), and other groups known to a person skilled in the art, for instance heteroatoms containing groups such as ester, amide, azomethine. A non exhaustive list has been given by Shiota et al. in: Progr. Polym. Sci. 1997, vol.22, pp 975–1002, the content of said publication is herewith incorporated by reference.

The polymerization produces advantageously no by-products.

The monomeric and/or oligomeric precursor materials are preferably cured by using conventional methods. The monomers display a liquid crystalline behaviour in molten state and can be aligned in high magnetic or electric fields before or during curing. This results in uniaxial orientation of said precursors in the polymeric material and leads after curing to a polymeric material exhibiting a negative TEC along the fibre axis direction.

An adjustment of the chemical composition and the polymerization parameters allow to obtain a polymeric material with the suitable thermal expansion so that the negative TEC of the coating compensates the positive thermal variation of the diffractive grating structures.

The direct fixation of the coating on the optical fibre is ensured by adhesion between the polymeric material and the silica on all the surface of the diffractive grating.

The curing temperature is preferably above the maximum use temperature. It is the condition to obtain a composite polymer-fibre with uniform thermomechanical properties in the use temperature range from $-20°$ C. to $80°$ C.

The spectral response of the diffractive gratings during the packaging manufacturing (coating and curing) can be recorded. Thus, the desired Bragg wavelength is adjustable if necessary by applying an additional mechanical stress to the fiber during the process.

The mounting principle is based on an one-step process and this simplification decreases the package cost.

What is claimed is:

1. Fibre grating filter optical waveguide device, comprising an optical fibre consisting essentially of silica, whereby said optical fibre has an area with a diffracting grating region, wherein said area with a diffracting grating region is in direct contact with a material having a negative thermal expansion coefficient $\alpha$ satisfying the following equation:

$$\alpha = -(dn_{eff}/dT)/n_{eff}$$

wherein $dn_{eff}/dT$ is the thermo-optic coefficient of the fibre material and $dn_{eff}$ is the effective refractive index.

2. Device according to claim 1, wherein the material is a polymeric material.

3. Device according to claim 2, wherein the polymeric material is a crosslinked polymeric material.

4. Device according to claim 2 or 3, wherein the monomeric and/or oligomeric precursor materials of said polymeric material display an anisotropic behavior.

5. Device according to claim 4, wherein the monomeric and/or oligomeric precursor materials of said polymeric material display liquid crystalline behaviour in the molten state.

6. Device according to claim 5, wherein the polymeric material displays anisotropic characteristics.

7. Device according to claim 6, wherein the polymeric material exhibits a negative linear thermo electrical coefficient along the fibre axis.

8. Method for manufacturing a device, comprising the following steps: forming a diffraction grating area along an optical axis of an optical fibre bringing in contact of at least said area of the optical fibre with monomeric and/or oligomeric precursor materials give a layer or a coating of said monomeric and/or oligomeric precursor materials, wherein said diffraction grating area is in direct contact with said monomeric and/or oligomeric precursor materials having a negative thermal expansion coefficient, $\alpha$, satisfying the following equation:

$$\alpha = -(dn_{eff}/dT)/n_{eff}$$

wherein $dn_{eff}/dT$ is the thermo-optic coefficient of the fibre material and $dn_{eff}$ is the effective refractive index.

9. Method according to claim 8, wherein the curing is carried out by temperature, UV, electron beam or gamma irradiation.

10. Method according to claim 8 or 9, wherein the monomeric and/or oligomeric precursor materials are aligned by a magnetic field in the fibre axis direction before or during curing.

* * * * *